United States Patent
He et al.

(10) Patent No.: US 12,063,071 B2
(45) Date of Patent: Aug. 13, 2024

(54) REGISTRATION METHOD AND DEVICE, METHOD FOR WRITING REGISTRATION INFORMATION, OPTICAL LINE TERMINAL, AND OPTICAL NETWORK UNIT

(71) Applicant: ZTE CORPORATION, Shenzhen (CN)

(72) Inventors: Jiangyan He, Shenzhen (CN); Weiliang Zhang, Shenzhen (CN); Liquan Yuan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 23 days.

(21) Appl. No.: 17/909,632

(22) PCT Filed: Feb. 1, 2021

(86) PCT No.: PCT/CN2021/074664
§ 371 (c)(1),
(2) Date: Sep. 6, 2022

(87) PCT Pub. No.: WO2021/179846
PCT Pub. Date: Sep. 16, 2021

(65) Prior Publication Data
US 2023/0144582 A1    May 11, 2023

(30) Foreign Application Priority Data
Mar. 7, 2020    (CN) .......................... 202010154280.7

(51) Int. Cl.
*H04B 10/272* (2013.01)
(52) U.S. Cl.
CPC .................. *H04B 10/272* (2013.01)

(58) Field of Classification Search
None
See application file for complete search history.

(56) References Cited

U.S. PATENT DOCUMENTS 6,546,014 B1 * 4/2003 Kramer ................ H04B 10/272
370/449

FOREIGN PATENT DOCUMENTS

| CN | 101621331 A | | 1/2010 |
|---|---|---|---|
| CN | 101692672 A | * | 4/2010 |

(Continued)

OTHER PUBLICATIONS

International Search Report in application PCT/CN2021/074664 dated May 8, 2021, 6 pages, including translation.

(Continued)

*Primary Examiner* — David W Lambert
(74) *Attorney, Agent, or Firm* — Morgan, Lewis & Bockius LLP (57) ABSTRACT

Provided is a method for registering an optical network unit. The method is used for an optical line terminal. The method for registering an optical network unit comprises: according to pre-acquired registration information of an optical network unit to be registered, issuing registration configuration information, so as to complete registration of said optical network unit, wherein the registration information of said optical network unit is acquired before the present registration starts. Further provided are a method for writing registration information, an optical line terminal, an optical network unit, a front-facing optical network unit, and a registration device.

16 Claims, 6 Drawing Sheets

(56) References Cited

FOREIGN PATENT DOCUMENTS

| | | | |
|---|---|---|---|
| CN | 101692672 A | | 4/2010 |
| CN | 104753586 A | * | 7/2015 |
| CN | 104753586 A | | 7/2015 |
| CN | 105721963 A | | 6/2016 |
| CN | 110350973 A | | 10/2019 |
| CN | 110418217 A | | 11/2019 |
| EP | 3537628 A1 | | 9/2019 |
| JP | 2017005385 A | | 1/2017 |

OTHER PUBLICATIONS

Extended European Search Report for Application No. 21767226.0 dated Mar. 5, 2024, 13 pages.

Zhang, Weiliang, "Text proposal of low latency ONU activation process", ITU-T Draft; Study Period 2017-2020; Study Group 15; Series CN, International Telecommunication Union, Geneva; CH, vol. 2/15, Apr. 15, 2020 (Apr. 15, 2020), pp. 1-7.

Zhang, Weiliang, "TC layer 1-15 aspects of dedicated activation wavelength for quiet window elimination in 50G-PON", ITU-T Draft; Study Period 2017-2020; Study Group 15, International Telecommunication Union, Geneva; CH, vol. 2/15, Oct. 17, 2019 (Oct. 17, 2019), pp. 1-6.

* cited by examiner

Issue registration configuration information according to pre-acquired registration information of a to-be-registered ONU, so as to complete registration of the to-be-registered ONU — S101

REGISTRATION METHOD AND DEVICE, METHOD FOR WRITING REGISTRATION INFORMATION, OPTICAL LINE TERMINAL, AND OPTICAL NETWORK UNIT

CROSS REFERENCE TO RELATED APPLICATIONS

This is a National Stage Application, filed under 35 U.S.C. 371 of International Patent Application No. PCT/CN2021/074664, filed on Feb. 1, 2021, which is based on and claims priority to Chinese Patent Application No. 202010154280.7 filed with the China National Intellectual Property Administration (CNIPA) on Mar. 7, 2020, the disclosure of which is incorporated herein by reference in its entirety.

This application claims priority to Chinese Patent Application No. 202010154280.7 filed with the China National Intellectual Property Administration (CNIPA) on Mar. 7, 2020, the disclosure of which is incorporated herein by reference in its entirety.

TECHNICAL FIELD

Embodiments of the present disclosure relate to the field of passive optical network technology, for example, a method and device for registering an optical network unit, a method for writing registration information, an optical line terminal, an optical network unit, a front optical network unit and a registration device.

BACKGROUND

A passive optical network (PON) is a point-to-multipoint network topology and is usually composed of an optical line terminal (OLT) located in the central office, multiple optical network units (ONUs) located at a user end and an optical distribution network (ODN) located between the OLT and the ONUs.

With the development of communication technology, due to its excellent characteristics such as low cost, large bandwidth, long distance and passivity, passive optical network technology has become one of the important technologies for traffic with strict transmission delay requirements, such as mobile fronthaul, mobile backhaul, high-definition video traffic, augmented reality (AR) traffic and the like.

When a new optical network unit needs to be connected to a passive optical network or an optical network unit is offline and re-online, it is necessary to register the optical network unit, but in the registration process, the extra delay may occur.

SUMMARY

Embodiments of the present disclosure provide a method for registering an optical network unit, a method for writing registration information, an optical line terminal, an optical network unit, a front optical network unit and a registration device.

In a first aspect, embodiments of the present disclosure provide a method for registering an optical network unit. The method is applied to an optical line terminal and includes the following:

Registration configuration information is issued according to pre-acquired registration information of a to-be-registered optical network unit, so as to complete registration of the to-be-registered optical network unit, where the registration information of the to-be-registered optical network unit is acquired before current registration starts.

In some embodiments, a process of pre-acquiring the registration information of the to-be-registered optical network unit includes the following. The registration information of the to-be-registered optical network unit is acquired in a registration or working process that the to-be-registered optical network unit has completed before the current registration.

In some embodiments, a process of pre-acquiring the registration information of the to-be-registered optical network unit includes the following:

Registration information of a front optical network unit is modified to the registration information of the to-be-registered optical network unit.

In some embodiments, before the registration information of the front optical network unit is modified to the registration information of the to-be-registered optical network unit, the method further includes the following:

Registration of the front optical network unit is completed, and the registration information of the front optical network unit is acquired in the registration process.

In some embodiments, the operation that the registration of the front optical network unit is completed includes: at least one response information sent by the front optical network unit is received; where the at least one response information is received through a registration channel different from a traffic channel.

In some embodiments, the registration information includes at least one of:

an identity of an optical network unit; where the identity of the optical network unit includes a serial number (SN) of the optical network unit or a media access control (MAC) address of the optical network unit; or an equalization delay (Epd) of an optical network unit.

In some embodiments, the registration configuration information includes at least one of:

a logical identifier of the to-be-registered optical network unit; where the logical identifier includes an optical network unit identifier (ONU-ID) of the to-be-registered optical network unit or a logical link identifier (LLID) of the to-be-registered optical network unit;

an equalization delay (Epd) of an optical network unit; or an authorized bandwidth distributed to the to-be-registered optical network unit.

In some embodiments, preset guard periods are provided respectively before and after the authorized bandwidth.

In some embodiments, after the registration configuration information is issued, the method further includes the following:

on-line response information sent by the to-be-registered optical network unit is received.

In some embodiments, after the registration configuration information is issued, the method further includes the following:

Traffic information sent by the to-be-registered optical network unit is received.

An equalization delay in the registration information of the to-be-registered optical network unit is adjusted according to the traffic information and an authorized bandwidth of the registration configuration information.

In some embodiments, the operation that the registration configuration information is issued includes the following:

The registration configuration information is periodically issued.

In some embodiments, the operation that the registration configuration information is issued includes the following.

In a case where a trigger condition, the registration configuration information is issued.

In some embodiments, the trigger condition includes at least one of the following conditions.

Predetermined trigger information is received.

Traffic information of an optical network unit other than the to-be-registered optical network unit is received, and a correctable error is found in the traffic information.

In a second aspect, embodiments of the present disclosure provide a method for registering an optical network unit. The method is applied to an optical network unit and includes the following:

Registration configuration information issued by an optical line terminal is received, so as to start registration; where the registration configuration information is issued by the optical line terminal according to pre-acquired registration information of a to-be-registered optical network unit, and the registration information of the to-be-registered optical network unit is acquired before current registration starts. Configuration is performed according to the registration configuration information.

In some embodiments, after configuration is performed according to the registration configuration information, the method further includes the following:

On-line response information is sent to the optical line terminal.

In some embodiments, before the registration configuration information issued by the optical line terminal is received, the method further includes the following:

Trigger information is sent to the optical line terminal.

In a third aspect, embodiments of the present disclosure provide a method for writing registration information. The method is applied to a front optical network unit and includes the following:

Registration is completed for an optical line terminal to acquire registration information of the front optical network unit.

Modification information corresponding to a to-be-registered optical network unit is received.

The optical line terminal is triggered according to the modification information to modify the registration information of the front optical network unit to registration information of the to-be-registered optical network unit.

In some embodiments, the operation that the registration is completed includes: at least one response information is sent to the optical line terminal.

The at least one response information is sent through a registration channel different from a traffic channel.

In a fourth aspect, embodiments of the present disclosure provide an optical line terminal. The optical line terminal includes a memory and one or more input/output (I/O) interfaces.

The memory is configured to store one or more programs, where the one or more programs, when executed by one or more processors, cause the optical line terminal to perform any method for registering an optical network unit described above.

The one or more I/O interfaces are connected between the one or more processors and the memory and are configured to implement the information interface between the one or more processors and the memory.

In a fifth aspect, embodiments of the present disclosure provide an optical network unit. The optical network unit includes a memory and one or more I/O interfaces.

The memory is configured to store one or more programs, where the one or more programs, when executed by one or more processors, cause the optical network unit to perform any method for registering an optical network unit described above.

The one or more I/O interfaces are connected between the one or more processors and the memory and are configured to implement the information interface between the one or more processors and the memory.

In a sixth aspect, embodiments of the present disclosure provide a front optical network unit. The front optical network unit includes a memory and one or more I/O interfaces.

The memory is configured to store one or more programs, where the one or more programs, when executed by one or more processors, cause the front optical network unit to perform any method for writing registration information described above.

The one or more I/O interfaces are connected between the one or more processors and the memory and are configured to implement the information interface between the one or more processors and the memory.

In a seventh aspect, embodiments of the present disclosure provide a registration device. The registration device is configured to connect an optical line terminal and includes a registration module, a receiving module, and a modification module.

The registration module is configured to complete registration for the optical line terminal to acquire registration information of the registration device; where response information loaded to the optical line terminal in a process of completing the registration is sent through a registration channel different from a traffic channel.

The receiving module is configured to receive modification information corresponding to a to-be-registered optical network unit.

The modification module is configured to trigger, according to the modification information, the optical line terminal to modify the registration information of the registration device to registration information of the to-be-registered optical network unit.

As can be seen, in the embodiments of the present disclosure, before the specific registration starts, the optical line terminal has pre-acquired the registration information for the to-be-registered optical network unit so that in the registration process, the optical line terminal may directly issue the registration configuration information to the to-be-registered optical network unit according to the pre-acquired registration information and does not need to receive the information from the to-be-registered optical network unit. That is, in the embodiments of the present disclosure, in the registration process, only the optical line terminal needs to "issue information", and there is no conflict in the process of issuing information, so no silent window needs to be opened in the registration process, thereby avoiding the influence of window opening on the system and greatly reducing the delay of traffic information.

The total amount of information transmitted in the registration process of the embodiments of the present disclosure is also reduced. For example, the identity request message, the ranging request message, the ranging response message and the like are not transmitted. Therefore, even if the silent window is not considered, the registration process itself consumes less time and less information.

Therefore, the embodiments of the present disclosure can achieve the fast registration of the optical network unit, reduce the delay of traffic information, and satisfy the requirements of traffic with strict transmission delay requirements, such as mobile fronthaul, mobile backhaul, high-definition video traffic, augmented reality (AR) traffic and the like.

DETAILED DESCRIPTION

The method for registering an optical network unit, a method for writing registration information, an optical line terminal, an optical network unit, a front optical network unit and a registration device provided by the embodiments of the present disclosure are described in detail below in conjunction with the drawings.

The embodiments of the present disclosure will be described more fully hereinafter with reference to the drawings; however, these embodiments may be embodied in different forms and should not be construed as limited to the embodiments set forth herein.

The embodiments of the present disclosure are described herein by means of schematic diagrams of the present disclosure and with reference to the plan views and/or cross-sectional views. Therefore, the example illustration may be modified according to manufacturing techniques and/or tolerances.

If not in collision, the embodiments of the present disclosure and features therein may be combined with each other.

The terms used herein are intended to describe particular embodiments and not to limit the present disclosure. As used herein, the term "and/or" includes any or all combinations of one or more of the associated listed items. As used herein, unless otherwise clearly indicated in the context, a singular form "one" and "the" is intended to include a plural form. The terms "includes" and "composed of" used herein specify the presence of stated features, entities, steps, operations, elements, and/or components, but do not preclude the presence or addition of one or more other features, entities, steps, operations, elements, components, and/or groups thereof. Unless otherwise defined, all terms (including technical and scientific terms) used herein have the same meaning as commonly understood by those having ordinary skill in the art.

The embodiments of the present disclosure are not limited to the embodiments shown in the drawings and include modifications of configurations formed based on manufacturing processes. Therefore, the regions illustrated in the drawings are schematic in nature and the shapes thereof illustrate the specific shapes of the regions of the elements but are not intended to be restrictive.

Term Explanation

In the embodiments of the present disclosure, without additional explanation, the meanings of the following technical terms should be understood according to the following explanation. "Registration" means that after an optical network unit (ONU) establishes a physical connection (that is, connection to a branch optical fiber) with an optical line terminal (OLT), both the ONU and the OLT may acquire the required information through information interaction so that ONU may be effectively controlled by the OLT, enter the working state, and achieve the interaction of traffic information with the OLT.

"Registration information" refers to the information that the OLT needs to use in the registration process, which may be obtained through the interaction with the ONU or calculated according to the information obtained through the interaction with the ONU.

"Registration configuration information" refers to the information that the ONU needs to acquire in the registration process, and the ONU needs to configure its own state according to the registration configuration information, so as to complete the registration process. Specifically, the registration configuration information may be a part of the registration information or may be calculated according to the registration information.

Figure 1:
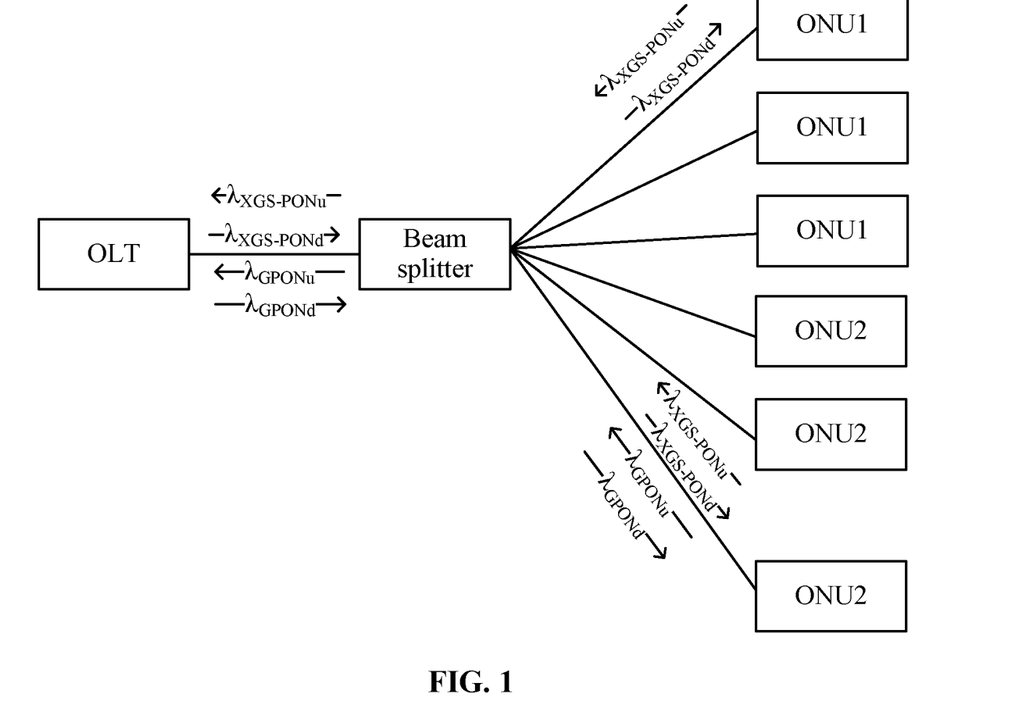
FIG. 1 is a structural block diagram of a passive optical network according to an embodiment of the present disclosure.

With reference to FIG. 1, in some related art, a passive optical network may include an OLT located at the central office, the OLT is separately connected to a plurality of branch fibers via an optical splitter, and each branch fiber may be connected to an ONU located at a user end.

Some ONUs are connected to the OLT only through one uplink and downlink channel, such a channel is also called a "traffic channel" and is used for transmitting traffic information, and these ONUs are called first ONUs (ONU1 in the figure) or non-low delay ONUs.

For example, the above-mentioned traffic channel may specifically include an uplink channel ($\lambda$XGS-PON$_u$) and a downlink channel (λXGS-PON$_d$) of a 10-Gigabit-capable symmetric PON (XGS-PON). The specific form of the traffic channel is not limited thereto.

After each ONU is registered, the ONU works according to an authorized bandwidth configured by the OLT for the ONU itself, so the uplink information of different ONUs must not interfere with each other. For an unregistered ONU, the uplink information sent by the ONU itself in the registration process may conflict with uplink information of another ONU, resulting in information loss, errors and so on.

Therefore, in the registration process of the first ONU, the OLT needs to open a silent window in the traffic channel to suspend the uplink information of other ONUs. However, this operation will lead to a serious delay in the transmission of the traffic information, and even the requirements of traffic with strict transmission delay requirements, such as mobile fronthaul, mobile backhaul, high-definition video traffic, AR traffic and the like cannot be satisfied.

Figure 2:
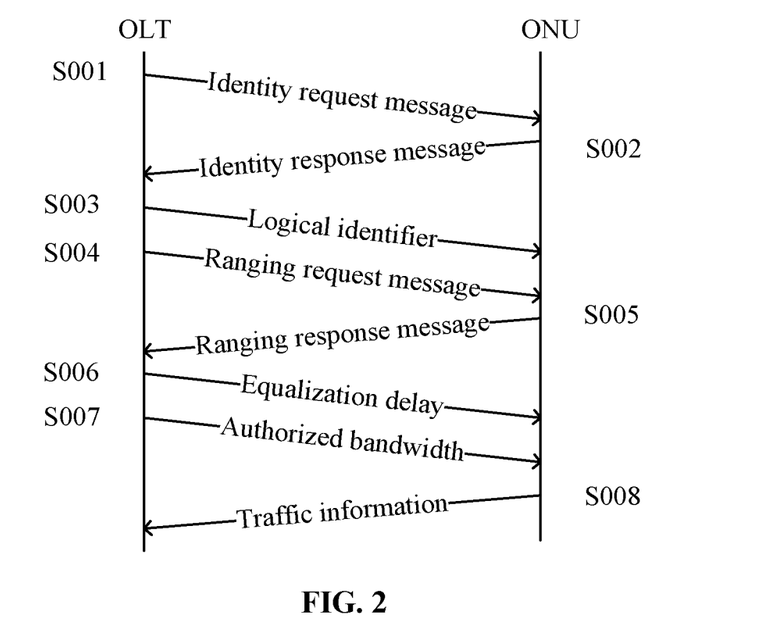
FIG. 2 is a signaling diagram of a method for registering a network unit according to an embodiment of the present disclosure.

The registration process of the first ONU may refer to FIG. 2 and includes S001 to S008.

In S001, the OLT periodically opens a silent window in a traffic channel and broadcasts and issues an identity request message.

In S002, if a first ONU has been accessed (established a physical connection) to a passive optical network but has not been registered, the first ONU sends an identity response message including its own identity to the OLT after receiving the identity request message.

The identity of the ONU is the unique flag for distinguishing different ONU devices, and the specific form of the identity may be different according to different forms of passive optical networks. For example, for an ONU of the Gigabit-capable symmetric PON (GPON) family, the identity may be a serial number (SN); and for an ONU of Ethernet passive optical network (EPON) family, the identity may be the media access control (MAC) address of the ONU.

The first ONU may be accessed and registered for the first time, and may also be re-accessed and re-registered after being registered and taken offline.

In S003, the OLT receives the identity response message, closes the silent window, determines that there is a first ONU to be registered at present, completes the "discovery" of the ONU, and issues a logical identifier to the first ONU.

The logical identifier is the unique flag that is distributed by the OLT for the ONU and plays the role of identifying the ONU in the passive optical network, and the specific form of the logical identifier may be different according to different forms of passive optical networks. For example, for the GPON family, the logical identifier of the ONU may be an ONU ID; and for the EPON family, the logical identifier of the ONU may be a logical link identifier (LLID) calculated according to a MAC address.

Since the OLT has acquired the identity of the first ONU and distributed the logical identifier to the first ONU, the information issued by the OLT to the first ONU is essentially of unicast instead of broadcast.

In S004, the OLT opens the silent window in the traffic channel again and issues a ranging request message to the first ONU.

In S005, the first ONU sends a ranging response message to the OLT after receiving the ranging request message.

In S006, the OLT receives the ranging response message, closes the silent window, may calculate a round-trip time (RTT) according to the time difference between the ranging request message and the ranging response message, may calculate an equalization delay (Eqd) of the OLT relative to the first ONU in conjunction with the wavelength of the traffic channel, completes the "ranging", and issues the equalization delay to the first ONU.

"Equalization delay" is a parameter indicating the time required for information transmission between the OLT and the corresponding ONU and is essentially determined by the equivalent distance or logical distance between the OLT and the corresponding ONU. It is to be understood that the specific parameter form of the equalization delay may be various, and as long as a certain parameter (or information) may substantially represent the above-mentioned content, such a parameter (or information) is called "equalization delay".

In S007, the OLT calculates an authorized bandwidth distributed to the first ONU according to the equalization delay and issues the authorized bandwidth to the first ONU.

In S008, the first ONU configures its own state according to the received logical identifier, equalization delay and authorized bandwidth, completes the registration, and then may start to send traffic information to the OLT according to the authorized bandwidth.

All kinds of information acquired by the OLT in the registration process may be called registration information, such as the identity, equalization delay, logical identifier, authorized bandwidth of the ONU, or some of the content may not belong to registration information, such as the logical identifier and the authorized bandwidth.

The information that is sent by the OLT to the ONU for the ONU to perform configuration is the registration configuration information, and the registration configuration information may specifically include the logical identifier, equalization delay, authorized bandwidth and the like. The registration configuration information may be a part of the registration information, and may also be calculated according to the registration information, for example, the authorized bandwidth may be calculated according to the equalization delay.

The specific content of the registration configuration information may be different for different types of passive optical networks. For example, in the EPON family, the equalization delay may not be sent to the ONU, and thus the equalization delay does not belong to the registration configuration information.

It can be seen that in the above-mentioned registration process, in order to ensure that the identity response message and the ranging response message of the first ONU do not conflict with the uplink information of other ONUs, it is necessary to open a silent window and stop the uploading of traffic information of other ONUs, which causes the delay of the traffic information.

In other related art, with reference to FIG. 1, there may also be other ONUs in the passive optical network that supports "third wavelength communication", and these ONUs are called second ONUs (ONU2 in the figure) or low latency ONUs.

The second ONU is connected to the OLT through the above-mentioned traffic channel and is also connected to the OLT through another registration channel, and the communication wavelength used in the registration channel is the third wavelength and is different from the communication wavelength used in the traffic channel.

For example, the above-mentioned registration channel includes an uplink channel (λPON$_u$) and a downlink channel (λPON$_d$) of a Gigabit-capable symmetric PON (GPON). The specific form of the registration channel is not limited thereto, as long as the registration channel is different from the traffic channel.

It is to be understood that the above-mentioned traffic channel and registration channel are relatively independent, that is, the information transmission in both channels does not affect each other.

Therefore, for the second ONU supporting the third wavelength communication, its registration-related information may be transmitted in the registration channel (a channel of the third wavelength), so that the registration process of the second ONU has no influence on the traffic information.

The specific registration process in the registration channel may correspond to the specific registration process of the first ONU in the traffic channel (only the channels are different), and details will not be repeated herein.

Although the ONU supporting the third wavelength communication does not cause the delay of traffic information during registration, many ONUs existing in the current network do not support the third wavelength communication, or there are non-low delay ONUs (the first ONUs), and these ONUs still have the delay problem.

Especially, in the promotion process of the new generation communication network (such as 5G communication networks), in order to take into account the existing network devices and the cost, it is usually impossible to build a passive optical network completely using low-delay ONUs, and there will still be the coexistence of low-delay ONUs and non-low delay ONUs for a long time.

In addition, for ONUs supporting the third wavelength communication, it is still necessary to open a silent window in the registration channel in the registration process. However, with the development of technology, the registration channel may also need to be used for transmitting other useful information, and the transmission of other information will also have a large delay due to the existence of the silent window.

In a first aspect, with reference to FIG. 1, an embodiment of the present disclosure provides a method for registering an ONU.

The method of this embodiment of the present disclosure is used for being executed by an OLT to complete the registration of the ONU.

Figure 3:
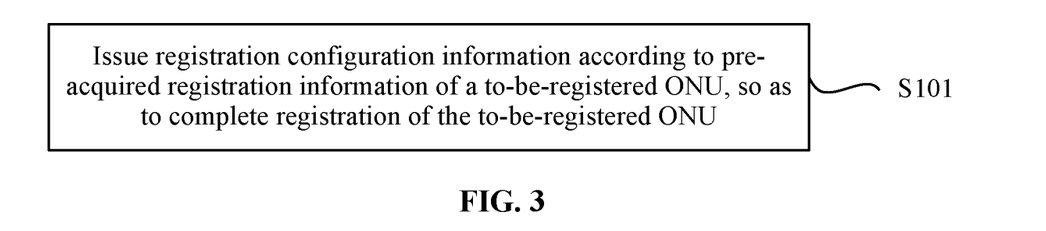
FIG. 3 is a flowchart of a method for registering an optical network unit according to an embodiment of the present disclosure.
Figure 4:
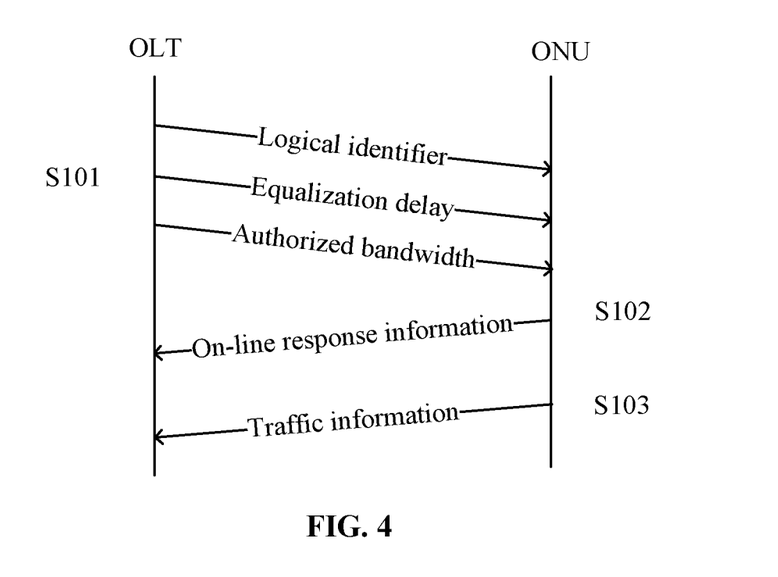
FIG. 4 is a signaling diagram of a method for registering an optical network unit according to an embodiment of the present disclosure.

With reference to FIGS. 3 and 4, the method of this embodiment of the present disclosure includes S101, S102, and S103.

In S101, registration configuration information is issued according to pre-acquired registration information of a to-be-registered ONU, so as to complete registration of the to-be-registered ONU.

The registration information of the to-be-registered ONU is acquired before current registration starts.

Before the start of the current registration, the OLT has acquired the registration information for the to-be-registered ONU (and may save the registration information) in some manners (specific manners will be described later) and may store the registration information. Therefore, when the current registration process starts, the OLT may directly use the acquired registration information in a case where the OLT does not acquire information (registration information) from the to-be-registered ONU, obtain registration configuration information, and issue (for example, in a broadcasting manner) the registration configuration information to the to-be-registered ONU for the to-be-registered ONU to perform configuration, so as to complete the registration process.

It is to be understood that an ONU is required to be registered only when the ONU is not registered, so the to-be-registered ONU should still be in the state of "not being registered" when S101 starts, and there is no possibility that a part of the registration process has been performed.

It is to be understood that since the registration information may relate to an access location (for example, a certain branch fiber), the to-be-registered ONU should be connected to a location corresponding to the registration information of the to-be-registered ONU.

It is to be understood that although the registration information of the to-be-registered ONU needs to be acquired before S101, it does not mean that the registration information of the to-be-registered ONU needs to be acquired every time S101 is performed, that is, after the OLT acquires the registration information of the to-be-registered ONU, S101 (that is, registration) may be performed multiple times using the registration information.

The specific content of the issued registration configuration information may include multiple items (such as a logical identifier, an equalization delay, an authorized bandwidth, and the like), and the content may be carried in one message and distributed at one time or may be distributed multiple times as shown in FIG. 4.

According to different application environments, the forms of the to-be-registered ONU in this embodiment of the present disclosure may be different.

For example, as one manner of this embodiment, the to-be-registered ONU may be an ONU that is registered, then goes offline and then is "re-accessed".

In another example, as another manner of this embodiment, the to-be-registered ONU may be a "brand new" accessed ONU that has never been registered before.

In another example, as another manner of this embodiment, a branch fiber may be once connected to an ONU, and then the ONU is "replaced" as a to-be-registered ONU (at this point, the to-be-registered ONU is also a new one).

It can be seen that in this embodiment of the present disclosure, before the specific registration starts, the OLT has acquired the registration information for the to-be-registered ONU, so in the registration process, the OLT may directly issue the registration configuration information to the to-be-registered ONU according to the pre-acquired registration information and does not need to receive the information from the to-be-registered ONU. That is, in this embodiment of the present disclosure, only the OLT "issues information" in the registration process, and there is no conflict problem in the issued information, so the silent window does not need to be opened in the registration process, thereby avoiding the influence of window opening on the system and greatly reducing the delay of the traffic information.

The total amount of information transmitted in the registration process in this embodiment of the present disclosure is also reduced. For example, the identity request message, the ranging request message, the ranging response message and the like are not transmitted. Therefore, even if the silent window is not considered, the registration process itself consumes less time and has a smaller information amount.

Therefore, this embodiment of the present disclosure can achieve the fast registration of the ONU, reduce the delay of the traffic information, and satisfy the requirements of traffic with strict transmission delay requirements, such as mobile fronthaul, mobile backhaul, high-definition video traffic, AR traffic and the like.

In some embodiments, the registration information includes at least one of:

an identity of an ONU; where the identity of the ONU includes an SN of the ONU or a MAC address of the ONU; or an equalization delay (Epd) of an ONU.

In order to complete the registration, the OLT needs to obtain at least the identity and Eqd of the ONU, that is, the registration information should include the correspondence of "identity-Eqd".

The identifier may be the above-mentioned SN or MAC address.

In some embodiments, the registration configuration information includes at least one of:

a logical identifier of the to-be-registered ONU; where the logical identifier includes an ONU-ID of the to-be-registered ONU or a logical link identifier (LLID) of the to-be-registered ONU;

an equalization delay (Epd) of an ONU; or an authorized bandwidth distributed to the to-be-registered ONU.

In order to complete the registration, the information issued by the OLT to the to-be-registered ONU should at least include the logical identifier and authorized bandwidth distributed to the to-be-registered ONU, where the authorized bandwidth may be calculated according to the equalization delay (also may be determined in other manners); and meanwhile, in some passive optical networks, the equalization delay may also be issued to the to-be-registered ONU as the registration configuration information.

The identifier may be the above-mentioned SN, ONU-ID or LLID.

In some embodiments, preset guard periods are provided respectively before and after the above-mentioned authorized bandwidth.

Since the authorized bandwidth in this embodiment of the present disclosure is obtained according to a pre-stored equalization delay and is not obtained according to an equalization delay measured in real time, there may be certain errors (for example, errors caused by changes in the overall situation of the passive optical network). Therefore, there should be unused time before and after the distributed authorized bandwidth in this embodiment of the present disclosure, that is, there are large guard periods, so as to ensure that the OLT can still receive the traffic information of the to-be-registered ONU in the guard periods in a case where the authorized bandwidth has errors, thereby avoiding the conflict of the traffic information.

The specific contents and forms of the registration information and the registration configuration information may be adjusted according to needs. For example, if the equalization delay is not issued to the to-be-registered ONU, the equalization delay does not belong to the registration information. In another example, the logical identifier, the authorized bandwidth and the like may not belong to the registration information (so they are calculated before issuing), but they may also be directly included in the registration information (so they are extracted from the registration information before issuing).

In some embodiments, S101 in which the registration configuration information is issued includes: the registration configuration information is periodically issued.

As a manner of this embodiment of the present disclosure, the registration configuration information may be periodically and repeatedly issued, that is, after the registration information of the to-be-registered ONU is acquired, as long as the to-be-registered ONU has not started to be registered (for example, the to-be-registered ONU is found offline), the registration configuration information may be issued once every predetermined time to "try" to make the to-be-registered ONU be completely registered.

According to the above-mentioned manner, the to-be-registered ONU does not need to send any information before obtaining the authorized bandwidth, which will not affect the transmission of the traffic information.

In some embodiments, S101 in which the registration configuration information is issued includes: in a case where a trigger condition, the registration configuration information is issued.

In some embodiments, the trigger condition includes at least one of the following conditions.

Predetermined trigger information is received.

Traffic information of an ONU other than the to-be-registered ONU is received, and a correctable error is found in the traffic information.

Alternatively, as another manner of this embodiment of the present disclosure, the to-be-registered ONU may also be confirmed to be accessed through a certain condition, thereby triggering the issuing of the registration configuration information (that is, the registration process is triggered).

In an embodiment, the to-be-registered ONU may actively send trigger information to the OLT when it needs to be registered (for example, when it is accessed or receives a command from a user), so that the OLT starts to issue the registration configuration information after receiving the trigger information.

The above-mentioned trigger information may be a short message so that the probability of conflict between the trigger information and the traffic information uploaded by other ONUS is low; and even when the short message collides with the traffic information, although the traffic information will have an error, the error is usually correctable. Therefore, when the OLT discovers that there is an error in the received traffic information and the error is correctable, the OLT considers that the to-be-registered ONU actually sends the trigger information and then starts to issue the registration configuration information (that is, the OLT starts the registration process).

According to the above-mentioned manner, the OLT only issues the registration configuration information when the to-be-registered ONU actually needs to be registered, which does not cause the transmission of useless information, thereby reducing the occupation of the downlink channel.

In some embodiments, after the registration configuration information is issued, the method further includes S102.

In S102, on-line response information sent by the to-be-registered ONU is received.

After receiving the registration configuration information, the ONU may complete the registration and upload the traffic information within the authorized bandwidth.

However, in this embodiment of the present disclosure, the OLT only issues the information and does not receive the information from the to-be-registered ONU in the registration process, so the OLT cannot determine whether the to-be-registered ONU has received the registration configuration information and completes the registration. Therefore, with reference to FIG. 5, after receiving the registration configuration information and completing the registration, the to-be-registered ONU may feed back the on-line response information to the OLT in the authorized bandwidth configured for the to-be-registered ONU.

Figure 5:
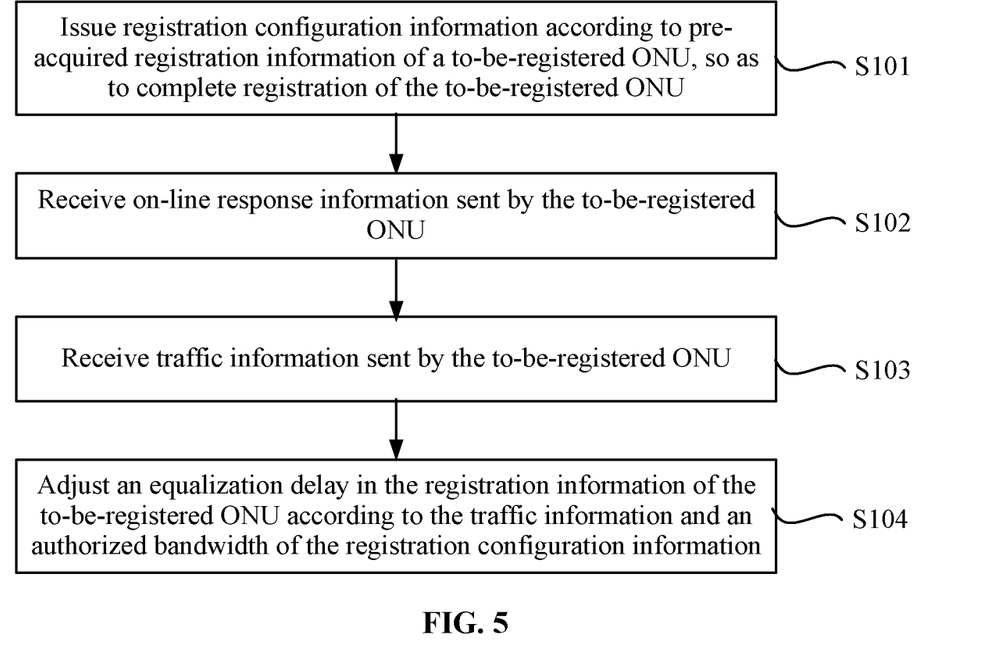
FIG. 5 is a flowchart of another method for registering an optical network unit according to an embodiment of the present disclosure.

Accordingly, the OLT determines that the registration of the to-be-registered ONU has been completed only after the OLT receives the on-line response information; otherwise, if the OLT does not receive the on-line response information within the predetermined time after the registration configuration information, the OLT may consider that the to-be-registered ONU has failed to complete the registration (for example, the to-be-registered ONU is not accessed or not powered up), and the OLT needs to issue the registration configuration information again at an appropriate opportunity.

The specific form of the on-line response information may be various. For example, the on-line response information may be implemented using an existing acknowledge message, as shown in the following table, where the ONU-ID is a logical identifier distributed to the to-be-registered ONU, SeqNo is 0, and Completion code is 0. The on-line response information may also be messages in other forms.

| Octet | Content | Description |
|---|---|---|
| 1 | ONU-ID | Sender identity |
| 3 | 0x09 | Message Type ID: "Acknowledgement". |
| 4 | SeqNo | Same as downstream sequence number. If the ONU has no upstream message to send (keep-alive grant from OLT), it sets the upstream sequence number to 0. |
| 5 | Completion_code | 0-OK<br>1-No message to send.<br>2-Busy, preparing a response.<br>3-Unknown message type.<br>4-Parameter error.<br>5-Processing error.<br>Other values reserved. |
| 6-40 | Padding | Set to 0x00 by the transmitter; treated as "don't care" by the receiver. |
| 41-48 | MIC | Message integrity check. |

In some cases (for example, when the registration configuration information is issued after the trigger condition is satisfied), it is considered by default that the to-be-registered ONU must receive the registration configuration information and complete the registration, so that the on-line response information is not required, and the OLT only needs to wait for the traffic information of the to-be-registered ONU after issuing the registration configuration information.

In some embodiments, after the registration configuration information is issued, the method further includes S103 and S104.

In S103, traffic information sent by the to-be-registered ONU is received.

In S104, an equalization delay in the registration information of the to-be-registered ONU is adjusted according to the traffic information and an authorized bandwidth of the registration configuration information.

With reference to FIGS. 4 and 5, after the registration is completed, the to-be-registered ONU may start to send the traffic information to the OLT according to the authorized bandwidth distributed to the to-be-registered ONU. As mentioned above, since the authorized bandwidth in this embodiment of the present disclosure is obtained according to a pre-stored equalization delay and is not obtained according to an equalization delay measured in real time, there may be certain errors (for example, errors caused by changes in the overall situation of the passive optical network).

Therefore, after the to-be-registered ONU starts the transmission of the traffic information, the equalization delay may be re-determined according to the time of receiving the traffic information, and the equalization delay in the acquired traffic information may be adjusted (or updated) to ensure the accuracy of the equalization delay, so as to "correct" the authorized bandwidth subsequently (for example, in the next registration).

Figure 6:
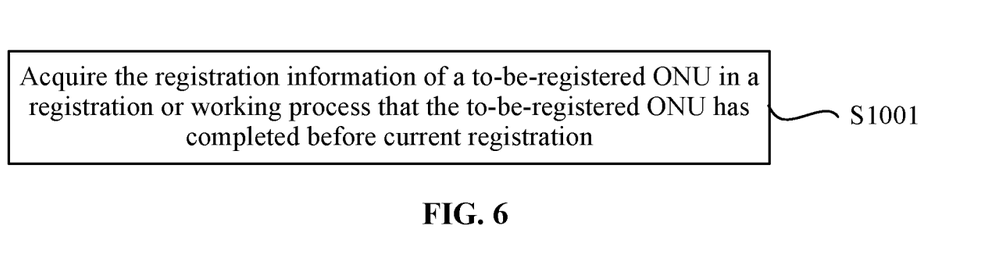
FIG. 6 is a flowchart of part operations in another method for registering an optical network unit according to an embodiment of the present disclosure.

In some embodiments, with reference to FIG. 6, the process of pre-acquiring the registration information of the to-be-registered ONU includes S1001.

In S1001, the registration information of the to-be-registered ONU is acquired in a registration or working process that the to-be-registered ONU has completed before the current registration.

That is, before the registration configuration information is issued (S101), the method of this embodiment of the present disclosure may further include the acquisition of the registration information of the to-be-registered ONU.

The acquisition of the registration information of the to-be-registered ONU specifically is that before the registration process (S101) starts, the OLT acquires the registration information of the to-be-registered ONU and saves the registration information in other registration processes performed by the registration information.

Alternatively, the acquisition of the registration information of the registered ONU may also be that before the current registration process (S101) starts, the to-be-registered ONU has been in the working state so that the OLT acquires the registration information of the to-be-registered ONU which is in the working state and saves the registration information (for example, the above-mentioned correction of the saved equalization delay).

It is to be understood that for the current registration process (S101), the to-be-registered ONU must be in the state of not being registered when the current registration process starts, that is, the to-be-registered ONU should go offline after registered (or working) to cause the OLT to acquire the registration information, and then the current registration process may start.

The above-mentioned registration of the to-be-registered ONU may be the first registration or the re-registration.

The above-mentioned registration of the to-be-registered ONU may be performed in a manner of the related art or in a manner of S101 of the embodiment of this embodiment of the present disclosure.

The to-be-registered ONU herein may be a low delay ONU (second ONU) supporting the third wavelength communication or a non-low delay ONU (first ONU) not supporting the third wavelength communication.

Figure 7:
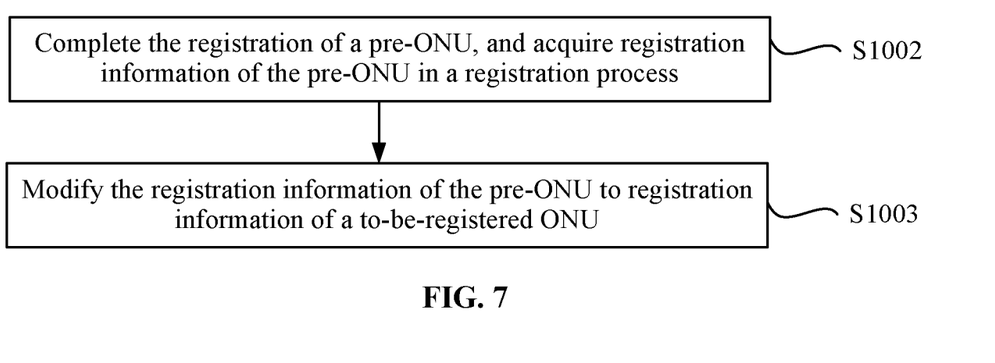
FIG. 7 is a flowchart of part operations in another method for registering an optical network unit according to an embodiment of the present disclosure.

In some embodiments, with reference to FIG. 7, the process of pre-acquiring the registration information of the to-be-registered ONU includes S1003.

In S1003, registration information of a front ONU is modified to the registration information of the to-be-registered ONU.

That is, before the registration configuration information is issued (S101), the method of this embodiment of the present disclosure may further include the acquisition of the registration information of the to-be-registered ONU.

As another manner of this embodiment of the present disclosure, the acquisition of the registration information of the registered ONU may also be that before the current registration process (S101) starts, the registration information of another ONU (front ONU) already exists in the OLT, and the registration information of the to-be-registered ONU may also be obtained through the modification of the registration information of the front ONU.

The front ONU is an ONU different from the to-be-registered ONU and is connected to a specific location (such as a specific branch fiber) where the to-be-registered ONU should be connected. The front ONU may be an entity device that actually exists and has been accessed to the passive optical network; or the front ONU may not be an entity device or has not been accessed to the passive optical network, as long as the OLT can pre-acquire the registration information about the front ONU.

Since the front ONU and the to-be-registered ONU should be connected at the same location, the information such as the equalization delay (Eqd) of the both should be the same. Therefore, the above-mentioned modification mainly refers to modifying the identity of the front ONU in the registration information of the front ONU to the identity of the to-be-registered ONU or modifying the correspondence of "identity-equalization delay", so that the registration information of the front ONU becomes the registration information of the to-be-registered ONU.

There are various manners to trigger the above-mentioned modification.

For example, a network manager may send modification information to the OLT through a special operation to modify the registration information of the front ONU stored therein.

Alternatively, the front ONU itself sends modification information to the OLT after the registration is completed to modify the registration information of the front ONU stored therein.

In some embodiments, before the registration information of the front ONU is modified to the registration information of the to-be-registered ONU (S1003), the method further includes S1002.

In S1002, the registration of the front ONU is completed, and the registration information of the front ONU is acquired in the registration process.

That is, before the registration information of the front ONU is modified, the front ONU may actually be accessed to the passive optical network and the registration is completed, so that the OLT may acquire the registration information for the front ONU in the registration process and use the acquired registration information for subsequent modification.

Specifically, there may be one ONU that has been connected to the passive optical network, and when the ONU needs to be replaced with another ONU, the registration information of the former ONU in the OLT may be pre-modified, so that the ONU to be replaced is the front ONU and the new ONU after the replacement is the to-be-registered ONU.

Alternatively, after it is determined that the to-be-registered ONU is to be accessed at a certain location, one specific front ONU (registration device) is accessed to the location and subjected to the above-mentioned modification, and then the front ONU is changed to the to-be-registered ONU, or the to-be-registered ONU is also accessed to the location (for example, a branch fiber may have two ports connecting the front ONU and the to-be-registered ONU respectively).

That is, the above-mentioned manner is equivalent to the operation of using the front ONU to make the OLT pre-acquire the registration information of the to-be-registered ONU and then actually accessing the to-be-registered ONU.

In some embodiments, the process that the registration of the front ONU is completed includes: at least one response information sent by the front ONU is received; where the at least one response information is received through a registration channel different from a traffic channel.

According to some registration manners, the registration of the ONU may include the information interface between the OLT and the ONU (for example, when the registration manner in the related art is adopted). In order to prevent the delay of the traffic information caused by the registration of the front ONU, the front ONU may be a low-delay ONU (second ONU) supporting the third wavelength communication, and in the registration process, at least uplink information is transmitted through the traffic channel (therefore, it is not necessary to open a silent window in the traffic channel).

When the registration configuration information of the to-be-registered ONU is issued in the subsequent process, the registration configuration information may still be issued through the traffic channel, that is, the to-be-registered ONU may be a non-low delay ONU (first ONU) that does not support the third wavelength communication.

That is, the above-mentioned manner may be: when a non-low delay ONU (first ONU) is to be registered, a low-delay ONU (second ONU) may be used as the front ONU, so as to avoid the non-low delay ONU from being registered according to the manner of the related art and minimize the delay of the traffic information.

It is to be understood that as long as the uplink information in the registration process is sent in the registration channel, there is no need to open a silent window in the traffic channel, and there will be no delay in the traffic information. Therefore, the embodiments of the present disclosure do not limit the transmission channel of downlink information in the registration process.

The following is an example description of how to pre-acquire the registration information of the to-be-registered ONU using a low-delay ONU (an ONU supporting the third wavelength communication, that is, second ONU) as a front ONU.

For the structure of the passive optical network, reference may be made to FIG. 1. The passive optical network includes multiple ONUs connected to the OLT, some of these ONUs are low-delay ONUs, that is, each ONU2 in the figure, and the others are a non-low delay ONUs (ONUs that do not support the third wavelength communication, that is, first ONUs), that is, each ONU1 in the figure.

The traffic channel is XGS-PON uplink and downlink channels, and the registration channel of the second ONU is GPON uplink and downlink channels.

In an embodiment, the above-mentioned process may include A101, A102, A103, A104, A105 and A106.

In A101, an OLT opens a silent window in a GPON channel and broadcasts and sends an identity request message through a GPON downlink channel.

In A102, the OLT receives an identity response message sent by the second ONU through a GPON uplink channel and closes the silent window to obtain the SN of the second ONU carried in the identity response message and obtain the ONU ID to be distributed to the second ONU according to the SN.

In A103, the OLT opens a silent window in the GPON uplink channel again and sends a ranging request message to the second ONU through the GPON downlink channel.

In A104, the OLT receives a ranging response message sent by the second ONU in the GPON uplink channel, calculates an equalization delay (Eqd), and acquires the registration information of the second ONU (front ONU).

In A105, the OLT distributes the ONU ID and an authorized bandwidth to the second ONU through the GPON downlink channel according to the registration information, and optionally, may also distribute the equalization delay to the second ONU through the GPON downlink channel, thereby completing the registration of the second ONU.

In A106, the OLT receives modification information (which may be from a network manager or the second ONU), and modifies the SN in the registration information of the second ONU (front ONU) to the SN of a first ONU to be replaced as (to-be-registered ONU) according to the modification information, thereby pre-acquiring the registration information of the o-be-registered ONU.

The above-mentioned registration process of the second ONU (front ONU) is completely performed in the registration channel, which does not affect the traffic information; and even if the to-be-registered ONU is the first ONU, since the registration process of the to-be-registered ONU only includes information "issuing", the silent window is still not required to be opened. That is, in the whole registration process, the silent window does not need to be opened in the traffic channel, which does not affect the transmission of the traffic information at all.

Figure 8:
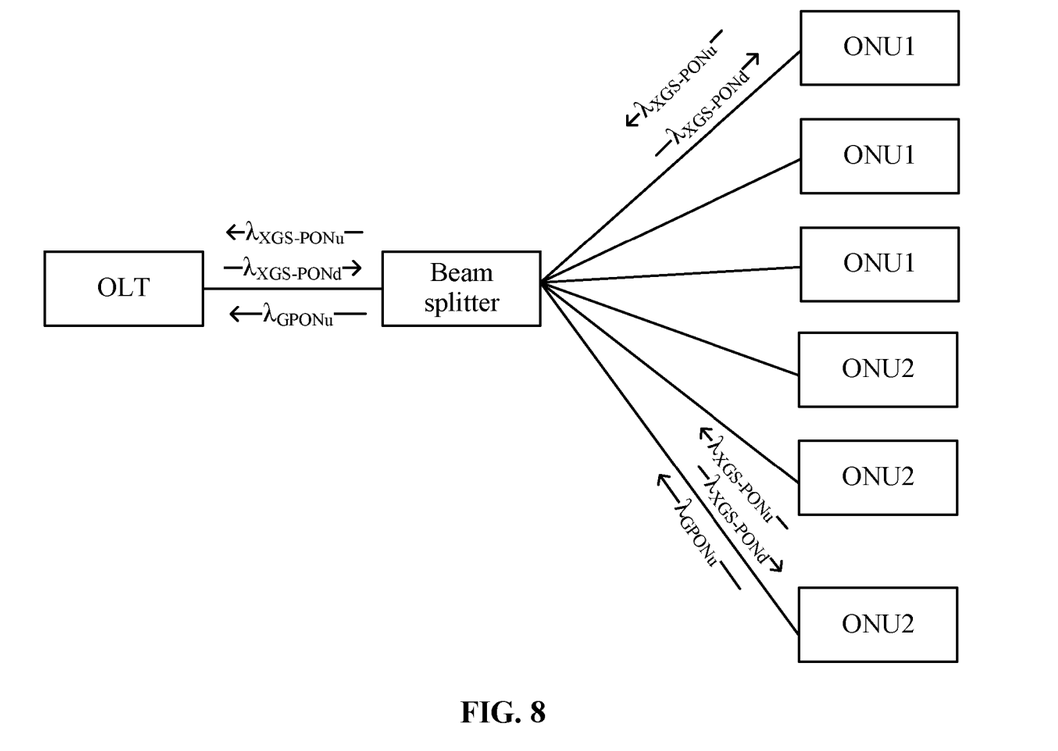
FIG. 8 is a structural block diagram of another passive optical network according to an embodiment of the present disclosure.

In some embodiments, with reference to FIG. 8, the registration channel of the second ONU used above may include only an uplink channel and not a downlink channel. For example, the second ONU may support only an uplink channel ($\lambda$XGS-PON$_u$) and a downlink channel ($\lambda$XGS-PON$_d$) of the XGS-PON and an uplink channel ($\lambda$PON$_u$) of the GPON.

Therefore, in the above-mentioned registration process of the second ONU, all information (the identity response message and the ranging response message) uploaded to the OLT by the second ONU is still received by the OLT after a silent window is opened in the registration channel; and all information (the identity request message, the ranging request message, and the registration configuration information) sent by the OLT to the second ONU is sent through the traffic channel.

According to the above-mentioned manner, there may be a case where an identity request message is broadcasted and issued when no silent window is opened in the traffic channel, and thus, if there is an unregistered first ONU, the unregistered first ONU may "mistakenly think" that the identity request message is issued for itself and then mistakenly feeds back an identity response message in the traffic channel, which causes conflicts with the traffic information of other ONUs.

In order to avoid the above-mentioned situation, it is necessary to modify the format of the identity request message in the registration channel to distinguish the identity request message for the second ONU from the identity request message for the first ONU, so that the first ONU does not mistakenly respond to the identity request message for the second ONU. The specific manners of distinguishing different identity request messages are various, and details will not be repeated herein.

In the above-mentioned process, when the OLT issues the ranging request message and the registration configuration information, the OLT has already acquired the identity of the second ONU, so the issued information is of unicast and the above-mentioned problem does not exist.

In a second aspect, an embodiment of the present disclosure provides a method for registering an ONU. The method is applied to an ONU.

The method of this embodiment of the present disclosure is used for an ONU (to-be-registered ONU) to complete the above-mentioned registration process.

Figure 9:
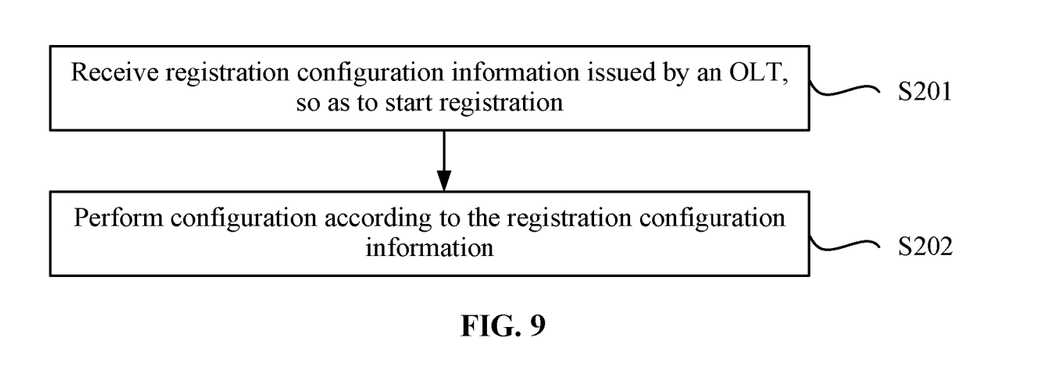
FIG. 9 is a flowchart of another method for registering an optical network unit according to an embodiment of the present disclosure.

With reference to FIG. 9, the method of this embodiment of the present disclosure includes S201 and S202.

In S201, registration configuration information issued by an OLT is received, so as to start registration.

The registration configuration information is issued by the OLT according to pre-acquired registration information of a to-be-registered ONU, and the registration information of the to-be-registered ONU is acquired before current registration starts.

After an ONU is accessed, if the OLT has pre-acquired the registration information for the ONU, the ONU is the to-be-registered ONU. Therefore, the ONU directly receives the registration configuration information issued by the OLT and starts to be registered.

It is to be understood that the above-mentioned "start to be registered" means that the ONU only starts its own registration process after receiving the registration configuration information, and before that, no identity response message and no ranging response message are sent.

In S202, configuration is performed according to the registration configuration information.

After the ONU receives the registration configuration information for itself, the ONU may configure itself according to the content of the registration configuration information (such as an authorized bandwidth, a logical identifier, and the like), so that the ONU may complete the registration, enter the working state and start to upload traffic information.

Figure 10:
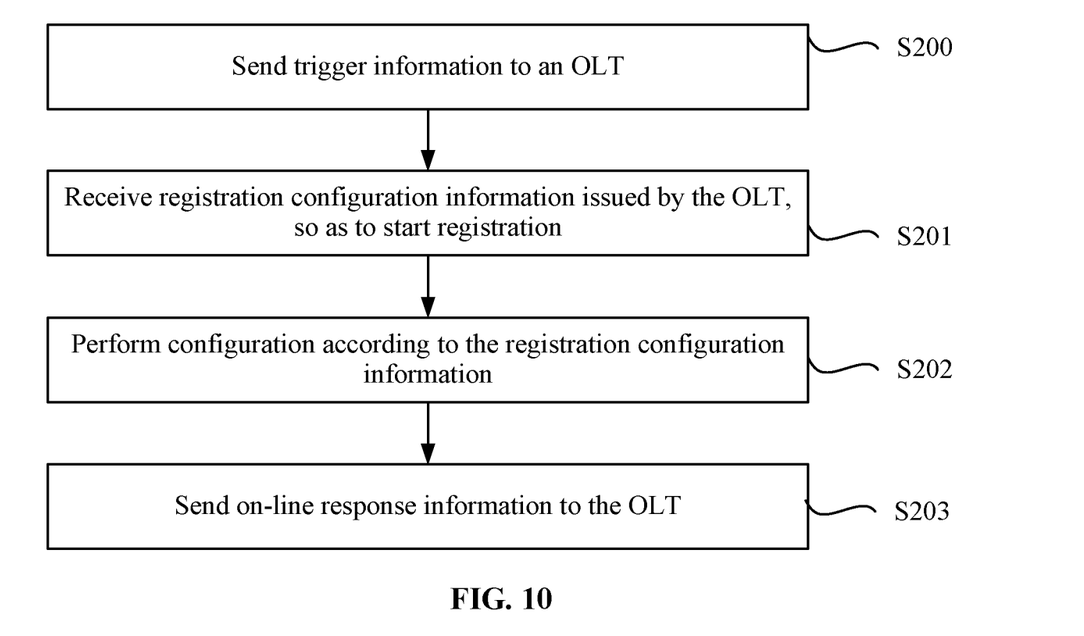
FIG. 10 is a flowchart of another method for registering an optical network unit according to an embodiment of the present disclosure.

In some embodiments, with reference to FIG. 10, after configuration is performed according to the registration configuration information (S202), the method further includes S203.

In S203, on-line response information is sent to the OLT.

As mentioned above, after the ONU completes the configuration according to the registration configuration information and enters the working state, the ONU may send on-line response information to the OLT in the authorized bandwidth to inform the OLT that the registration of the ONU itself is completed.

In some embodiments, with reference FIG. 10, before the registration configuration information issued by the OLT is received, the method further includes S200.

In S200, trigger information is sent to the OLT.

As mentioned above, when the ONU needs to be registered (for example, when it is accessed or receives a command from a user), the ONU may send on-line response information (for example, a short message) to the OLT to inform the OLT to start to send the registration configuration information.

In a third aspect, an embodiment of the present disclosure provides a method for writing registration information. The method is applied to a front ONU.

The method of this embodiment of the present disclosure is used for the above-mentioned front ONU to perform registration and modify the registration information of the front ONU in the OLT to obtain the registration information of the to-be-registered ONU.

Figure 11:
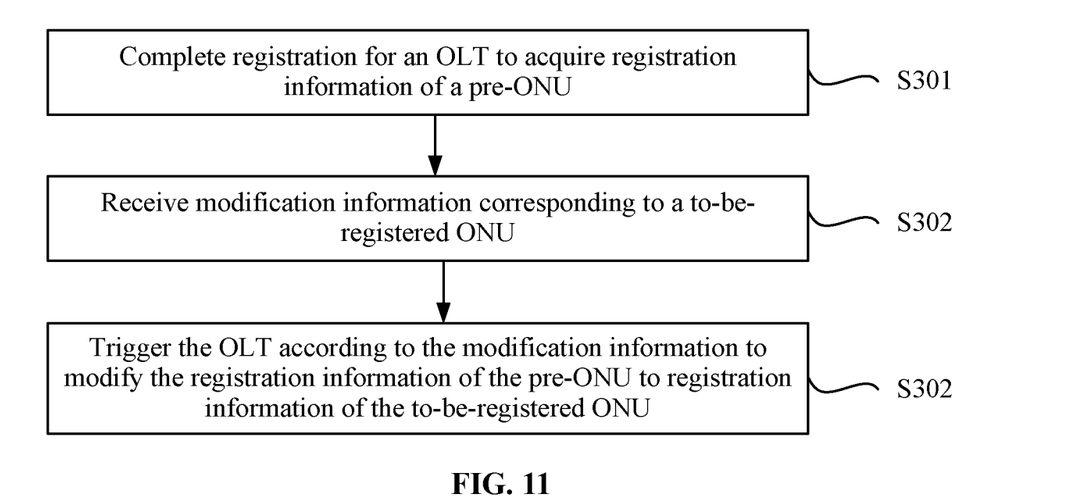
FIG. 11 is a flowchart of a method for writing registration information according to an embodiment of the present disclosure.

With reference to FIG. 11, the method of this embodiment of the present disclosure includes S301, S302 and S303.

In S301, registration is completed for an OLT to acquire registration information of the front ONU.

The front ONU completes the registration after being accessed to the passive optical network, which may be specifically performed in a manner of the related art or in a manner of S101 of the embodiment of the present disclosure, and details will not be repeated herein.

In the registration process, the OLT acquires the registration information of the front ONU for the front ONU. For example, if the identity of the front ONU is SN A and the equalization delay is Eqd1, the registration information of the front ONU acquired by the OLT includes the correspondence of "SN A-Eqd1".

In S302, modification information corresponding to a to-be-registered ONU is received.

The front ONU receives modification information indicating how to modify. For example, the modification information may be inputted by a user, which may include the identity of the to-be-registered ONU, such as SN B.

In S303, the OLT is triggered according to the modification information to modify the registration information of the front ONU to registration information of the to-be-registered ONU.

According to the above-mentioned modification information (such as SN B), the front ONU may send an instruction to the OLT to make the OLT modify the registration information of the front ONU to obtain the registration information of the to-be-registered ONU. For example, the correspondence of "SN A-Eqd1" in the registration information of the front ONU may be modified to "SN B-Eqd1".

It is to be understood that S302 and S303 may not be necessarily sequential as long as both are completed before S303.

It can be seen that the OLT has pre-acquired the registration information of the to-be-registered ONU, so when the to-be-registered ONU is accessed and registered, it is not necessary to open a silent window, which can reduce the delay.

It is to be understood that after the registration information is modified, the front ONU becomes in a state of "not being registered" for the OLT, so the front ONU should no longer transmit traffic data.

After the modification is completed, the front ONU may be removed from the branch fiber and replaced with the to-be-registered ONU. If the branch fiber has two ports, the front ONU may also be retained and the to-be-registered ONU may be connected to the other port.

In some embodiments, the process where the registration is completed includes: at least one request information issued by the OLT is received and at least one response information is sent to the OLT; where the at least one response information is sent through a registration channel different from the traffic channel.

That is, the front ONU may be a low-delay ONU (an ONU supporting the third wavelength communication, that is, a second ONU) so that the registration process of the front ONU does not cause the delay of the traffic information.

Furthermore, when the to-be-registered ONU is a non-low delay ONU (an ONU that does not support the third wavelength communication, that is, a first ONU), the registration information of the non-low delay to-be-registered ONU is written using the front ONU which "borrows" the low delay, so as to ensure that the non-low delay to-be-registered ONU does not cause delay to traffic information even when the to-be-registered ONU is registered for the first time.

Figure 12:
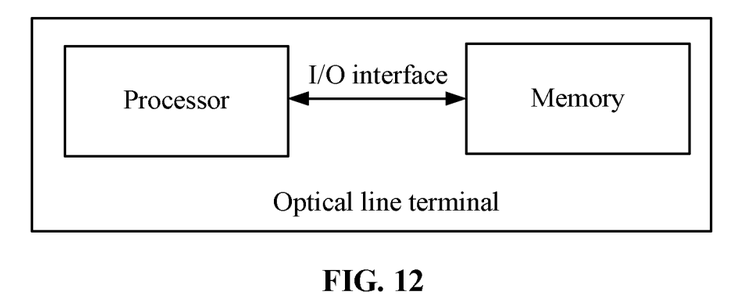
FIG. 12 is a structural block diagram of an optical line terminal according to an embodiment of the present disclosure.

In a fourth aspect, with reference to FIG. 12, an embodiment of the present disclosure provides an OLT. The OLT includes a memory and one or more input/output (I/O) interfaces.

The memory is configured to store one or more programs, where the one or more programs, when executed by one or more processors, cause the OLT to perform any method for registering an ONU described above.

The one or more I/O interfaces are connected between the one or more processors and the memory and configured to implement the information interface between the one or more processors and the memory.

Figure 13:
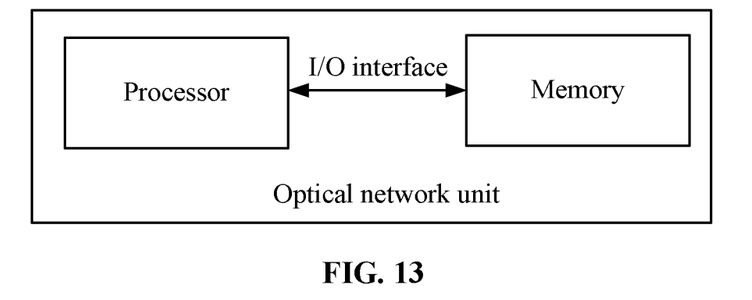
FIG. 13 is a structural block diagram of an optical network unit according to an embodiment of the present disclosure.

In a fifth aspect, with reference to FIG. 13, an embodiment of the present disclosure provides an ONU. The ONU includes a memory and one or more I/O interfaces.

The memory is configured to store one or more programs, where the one or more programs, when executed by one or more processors, cause the ONU to perform any method for registering an ONU described above.

The one or more I/O interfaces are connected between the one or more processors and the memory and are configured to implement the information interface between the one or more processors and the memory.

Figure 14:
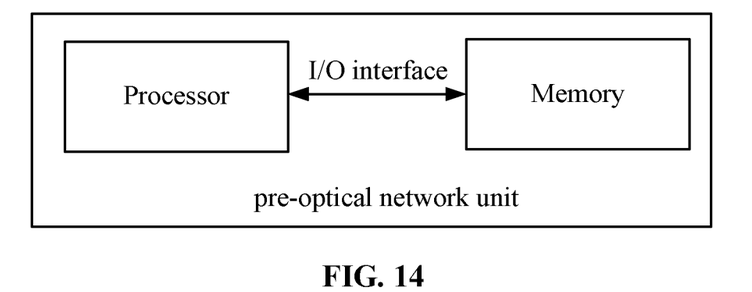
FIG. 14 is a structural block diagram of a front optical network unit according to an embodiment of the present disclosure.

In a sixth aspect, with reference to FIG. 14, an embodiment of the present disclosure provides a front ONU. The front ONU includes a memory and one or more I/O interfaces.

The memory is configured to store one or more programs, where the one or more programs, when executed by one or more processors, cause the ONU to perform any method for writing registration information described above.

The one or more I/O interfaces are connected between the one or more processors and the memory and are configured to implement the information interface between the one or more processors and the memory.

Figure 15:
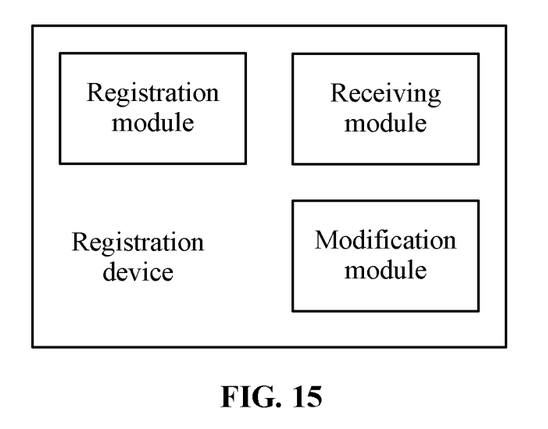
FIG. 15 is a block diagram of a registration device provided by an embodiment of the present disclosure.

In a seventh aspect, with reference to FIG. 15, an embodiment of the present disclosure provides a registration device. The registration device is configured to connect an OLT and includes a registration module, a receiving module, and a modification module.

The registration module is configured to complete registration for the OLT to acquire registration information of the registration device; where response information loaded to the OLT in the process of completing the registration is sent through a registration channel different from a traffic channel.

The receiving module is configured to receive modification information corresponding to a to-be-registered ONU.

The modification module is configured to trigger, according to the modification information, the OLT to modify the registration information of the registration device to registration information of the to-be-registered ONU.

The registration device of this embodiment of the present disclosure may be a low-delay ONU (but may not have the ability to transmit traffic information), and the registration device may be pre-accessed to the passive ONU to enable the OLT to pre-acquire its own registration information in the registration process. Moreover, the registration device may also receive the modification information of the user, so as to control the OLT to modify the registration information (for example, an identity) according to the modification information and obtain the registration information of the to-be-registered ONU for the subsequent registration of the to-be-registered ONU.

It is to be understood by those having ordinary skill in the art that function modules/units in all or part of the steps of the method, the system and the apparatus disclosed in the preceding description may be implemented as software, firmware, hardware or any appropriate combination thereof.

In a hardware implementation, the division of the function modules/the function units may not correspond to the division of physical components. For example, one physical component may have several functions, or one function or step may be performed jointly by several physical components.

Some or all physical components may be implemented as software executed by a processor such as a central processing unit (CPU), a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, random-access memories (RAMs) which specifically may be synchronous dynamic random-access memories (SDRAMs), double data rate synchronous dynamic random-access memories (DDR RAMs) and the like, read-only memories (ROMs), electrically erasable programmable read-only memories (EEPROMs), flash memories or other magnetic disk memories; compact disc read-only memories (CD-ROMs), digital video discs (DVDs) or other optical disc memories; magnetic cassettes, magnetic tapes, disk memories or other magnetic memories, or any other medium used for storing desired information and accessed by a computer. In addition, as is known to those having ordinary skill in the art, the communication media generally include volatile and nonvolatile media and removable and non-removable media implemented in any method or technology for storing information (such as computer-readable instructions, data structures, program modules or other data).

What is claimed is:

1. A method for registering an optical network unit, applied to an optical line terminal, comprising:
   issuing registration configuration information according to pre-acquired registration information of a to-be-registered optical network unit, so as to complete registration of the to-be-registered optical network unit, wherein the registration information of the to-be-registered optical network unit is acquired before current registration starts;
   wherein a process of pre-acquiring the registration information of the to-be-registered optical network unit comprises:
   modifying registration information of a front optical network unit to the registration information of the to-be-registered optical network unit;
   wherein the front optical network unit is an optical network unit different from the to-be-registered optical network unit, and the front optical network unit and the to-be-registered optical network unit are connected at a same location.

2. The method of claim 1, before the modifying the registration information of the front optical network unit to the registration information of the to-be-registered optical network unit, further comprising:
   completing registration of the front optical network unit, and acquiring the registration information of the front optical network unit in the registration process.

3. The method of claim 2, wherein
   the completing the registration of the front optical network unit comprises: receiving at least one response information sent by the front optical network unit; wherein the at least one response information is received through a registration channel different from a traffic channel.

4. The method of claim 1, wherein the registration information comprises at least one of:
   an identity of an optical network unit, wherein the identity of the optical network unit comprises a serial number of the optical network unit or a media access control (MAC) address of the optical network unit; or
   an equalization delay of an optical network unit.

5. The method of claim 1, wherein the registration configuration information comprises at least one of:
   a logical identifier of the to-be-registered optical network unit, wherein the logical identifier comprises an optical network unit identifier (ONU-ID) of the to-be-registered optical network unit or a logical link identifier of the to-be-registered optical network unit;
   an equalization delay of the to-be-registered optical network unit; or
   an authorized bandwidth distributed to the to-be-registered optical network unit.

6. The method of claim 5, wherein preset guard periods are configured respectively before and after the authorized bandwidth.

7. The method of claim 5, after issuing the registration configuration information, further comprising:
   receiving on-line response information sent by the to-be-registered optical network unit.

8. The method of claim 1, after the issuing the registration configuration information, further comprising:
   receiving traffic information sent by the to-be-registered optical network unit; and
   adjusting an equalization delay in the registration information of the to-be-registered optical network unit according to the traffic information and an authorized bandwidth of the registration configuration information.

9. The method of claim 1, wherein the issuing the registration configuration information comprises:
   periodically issuing the registration configuration information.

10. The method of claim 1, wherein the issuing the registration configuration information comprises:
    in a case where a trigger condition is satisfied, issuing the registration configuration information.

11. The method of claim 10, wherein the trigger condition comprises at least one of the following:
    predetermined trigger information is received; or
    traffic information of an optical network unit other than the to-be-registered optical network unit is received, and a correctable error is found in the traffic information.

12. A method for registering an optical network unit, applied to an optical network unit and comprising:
    receiving registration configuration information issued by an optical line terminal and starting registration; wherein the registration configuration information is issued by the optical line terminal according to pre-acquired registration information of a to-be-registered optical network unit, and the registration information of the to-be-registered optical network unit is acquired before current registration starts; and
    performing configuration according to the registration configuration information;
    wherein a process of pre-acquiring the registration information of the to-be-registered optical network unit comprises:
    modifying registration information of a front optical network unit to the registration information of the to-be-registered optical network unit;
    wherein the front optical network unit is an optical network unit different from the to-be-registered optical network unit, and the front optical network unit and the to-be-registered optical network unit are connected at a same location.

13. The method of claim 12, after the performing configuration according to the registration configuration information, further comprising:
sending on-line response information to the optical line terminal.

14. The method of claim 12, before the receiving the registration configuration information issued by the optical line terminal, further comprising:
sending trigger information to the optical line terminal.

15. An optical line terminal, comprising:
a memory storing one or more programs, wherein the one or more programs are executed by one or more processors to cause the optical line terminal to perform the method for registering an optical network unit of claim 1; and
one or more input/output (I/O) interfaces, which are connected between the one or more processors and the memory and configured to implement information interface between the one or more processors and the memory.

16. A registration device, configured to connect an optical line terminal and comprising:
a registration module, which is configured to complete registration for the optical line terminal to acquire registration information of the registration device; wherein response information loaded to the optical line terminal in a process of completing the registration is sent through a registration channel different from a traffic channel;
a receiving module, which is configured to receive modification information corresponding to a to-be-registered optical network unit; and
a modification module, which is configured to trigger, according to the modification information, the optical line terminal to modify the registration information of the registration device to registration information of the to-be-registered optical network unit.

* * * * *